United States Patent
Budell

(10) Patent No.: US 7,092,121 B2
(45) Date of Patent: Aug. 15, 2006

(54) HARD COPY COLOR MATCHING

(75) Inventor: Janie W. Budell, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1041 days.

(21) Appl. No.: 09/792,259

(22) Filed: Feb. 23, 2001

(65) Prior Publication Data

US 2002/0118378 A1    Aug. 29, 2002

(51) Int. Cl.
*G06F 15/00* (2006.01)
*G06K 1/00* (2006.01)

(52) U.S. Cl. ............... 358/1.9; 358/1.18; 358/504; 358/520

(58) Field of Classification Search ............ 358/1.9, 358/1.18, 504, 520; 382/165
See application file for complete search history.

(56) References Cited

U.S. PATENT DOCUMENTS

| | | | |
|---|---|---|---|
| 5,615,320 A | * | 3/1997 | Lavendel .................. 345/594 |
| 5,717,783 A | * | 2/1998 | Endo et al. ............... 382/167 |
| 5,732,151 A | * | 3/1998 | Moon et al. .............. 382/167 |
| 6,108,008 A | * | 8/2000 | Ohta ......................... 345/590 |
| 6,490,053 B1 | * | 12/2002 | Takahashi et al. ........ 358/1.18 |
| 2002/0102019 A1 | * | 8/2002 | Piatt et al. ................ 382/165 |

OTHER PUBLICATIONS

Barry Haynes and Wendy Crumpler; Photoshop 5 Artistry; 1998, New Riders Publishing; pp. 9-11,63-68.*

* cited by examiner

*Primary Examiner*—Kimberly Williams
*Assistant Examiner*—Michael Burleson

(57) ABSTRACT

A color swatch tool is printed out on different available printers on a print media of choice or on different available print media for a printer of choice. The tool includes a plurality of pallets having tiles of a hue in varying shades, or chroma values. The tool is adapted to a computer application program for creating color hard copy.

14 Claims, 3 Drawing Sheets
(2 of 3 Drawing Sheet(s) Filed in Color)

HARD COPY COLOR MATCHING

FIELD OF THE INVENTION

The present invention relates generally to colorimetry, more particularly to color hard copy printing, and specifically to methods, apparatus, and tools for color matching.

BACKGROUND OF THE INVENTION

Image processing is a fairly well developed science of modifying and analyzing pictures, graphics designs, and the like. See e.g., *Introduction to Image Processing Algorithms*, Benjamin M. Dawson, Byte Magazine, March 1987, pp. 169–186. A variety of different approaches to image interpolation have been proposed and used. Known manner colorimetry constructs and methods of multidimensional color space data interpolation are described in the literature, such as *Principles of Color Technology*, by Billmeyer and Saltzman, John Wiley & Sons, Inc., NY, publishers, copr. 1981 (2d ed.); *Color Science: Concepts and Methods, Quantitative Data and Formula*, by Wyszecki and Stiles, John Wiley & Sons, Inc., NY, publishers, copr. 1982 (2d ed.); and *Fundamentals of Interactive Computer Graphics*, Foley and Van Dam, Addison-Wesley Publishing Company.

Basically, colorimetry has long been recognized as a complex science. Essentially, as defined in 1931 by the Commission Internationale L'Eclairage (CIE), three primary colors (X, Y, Z) can be combined to define all light sensations we experience with our eyes; that is, the color matching properties of an ideal trichromatic observer defined by specifying three independent functions of wavelength that are identified with the ideal observer's color matching functions form an international standard for specifying color. In general, it has been found possible and convenient to represent color stimuli vectors by a three-dimensional spatial construct, called a tristimulus space or a colorspace. The fundamentals of such three-dimensional constructs are discussed in Billmeyer and Saltzman, supra, and the above cited *Color Science: Concepts and Methods, Quantitative Data and Formulae*, by Wyszecki and Stiles, published by John Wiley & Sons, Inc., copyright 1982 (2d ed.), see e.g. at pages 119–130. One of the most commonly referred to systems is the Munsell color system, a system for designating colors, which employs three perceptually uniform scales:

Munsell hue—the dimension that determines whether a color is blue, green, yellow, red, purple, or the like, without regard to its lightness or saturation;

Munsell value—the dimension that indicates the apparent luminous transmittance or reflectance of the object on a scale having approximately equal perceptual steps under the usual conditions of observation; and Munsell chroma—the dimension that corresponds most closely to saturation, which is the degree of vividness of a hue.

A variety of trichromatic model systems provide alternatives for both the hardware and software system designers—e.g., the red, green, blue (RGB) model commonly used in computer video displays; the cyan, magenta, yellow (and black) (CMY(K)) model used extensively in color hard copy apparatus; the hue, saturation, value (HSV) model; the hue, lightness, saturation (HLS) model; the luminance, red-yellow scale, green-blue scale (L*a*b*) model; the YIQ model used in commercial color television broadcasting; and others. Color input and output devices—such a scanners, cathode ray tube (CRT) video monitors, and printers—present color images in a device-dependent fashion. For example, CRT guns are driven by RGB values (voltage levels or other input signal functions, referred to hereinafter as data triplets or color coordinates) that are stored in a frame buffer. Those RGB values index over the color space of each particular model video monitor; in other words, the color produced by a CRT on a pixel of its screen for a given RGB triplet of values is unique to that device. Because of device design dependency, the same RGB triplet may produce a very different color or hue when displayed on a different model CRT and still a different color in a hard copy made with a color printer.

Color transformation (also referred to in the art as color correction and cross-rendering) between model systems in digital data processing presents many problems to the original equipment manufacturer. The transformation of data from one device to another device is difficult because the color matching relationship between those systems are generally non-linear. Therefore, a crucial problem is the maintaining of color integrity between an original image from an input device (such as a color scanner, CRT monitor, digital camera, computer software/firmware generation, and the like) and a translated copy at an output device (such as a CRT monitor, color laser printer, color ink-jet printer, and the like). A transformation from one color space to another requires complex, non-linear computations in multiple dimensions. Since such is not describable mathematically, it is known to use very large look-up tables to approximate a transformation between trichromatic model systems to correlate the wide spectrum of color hues that exist.

Another major problem is that a given code—namely, a set of tristimulus space coordinates—for a particular chroma, e.g., "Light Blue No. 1," can produce visual perceptual differences that are dependent on the current printer—and may vary from replaceable print cartridge to print cartridge—and on the current print media being used. Moreover, the end user may have a variety of printers and media at their disposal for a current print job.

The use of printed test patterns and optical hardware analysis of such patterns for various purposes including color matching are known in the art. Color correction algorithms can be used to match color with respect to standards. See e.g., U.S. Pat. No. 5,732,151, Mar. 24, 1999, by Moon et al. for a COMPUTERIZED MEMORY MAPPING METHOD FOR TRANSFORMING COLOR DATA (assigned to the common assignee herein). Often however, there is simply no substitution for the use of human visual acuity to render a final decision as to a "best" hard copy rendition.

When an end user has the capability of selecting from a plurality of color hard copy apparatus or a plurality of print media, there is a need for simple useful tools for providing an end user with representative examples of the results of each without the need for time-consuming experimental printing and without wasting valuable consumable resources.

SUMMARY OF THE INVENTION

In a basic aspect, the present invention provides a color matching tool device including: a set of color palettes; and each individual palette of the set of color palettes having a subset of differing chroma value tiles for a predetermined hue, wherein said set of color palettes is printable from a predetermined computer application program.

In another aspect, the present invention provides a method for determining color output from a hard copy apparatus, the method comprising: providing at least one, computer code based, set of color palettes, each set including a subset of differing chroma value tiles for a predetermined hue; and printing said set on each available print media.

In another aspect, the present invention provides a method for providing a color matching tool for color printing operations, the method comprising: providing at least one, computer code based, set of color palettes, each set including a subset of differing chroma value tiles for a predetermined hue; and printing said set on a each available color printer.

The foregoing summary is not intended to be an inclusive list of all the aspects, objects, advantages, and features of the present invention nor should any limitation on the scope of the invention be implied therefrom. This Summary is provided in accordance with the mandate of 37 C.F.R. 1.73 and M.P.E.P. 608.01 (d) merely to apprise the public, and more especially those interested in the particular art to which the invention relates, of the nature of the invention in order to be of assistance in aiding ready understanding of the patent in future searches. Objects, features and advantages of the present invention will become apparent upon consideration of the following explanation and the accompanying drawings, in which like reference designations represent like features throughout the drawings.

DESCRIPTION OF THE DRAWINGS

The file of this patent contains at least one drawing executed in color. Copies of this patent with color drawing(s) will be provided by the Patent and Trademark Office upon request and payment of the necessary fee.

DETAILED DESCRIPTION OF THE INVENTION

Reference is made now in detail to a specific embodiment of the present invention, which illustrates the best mode presently contemplated by the inventor for practicing the invention. Alternative embodiments are also briefly described as applicable.

For the purpose of describing the present invention, let the term "color" be defined as the wavelength composition of light, with particular reference to its visual appearance. Further, let the term "hue" be defined as the name of a color, such as red, yellow, green, blue, or purple, as perceived subjectively. Further, let the term "chroma" be defined as the dimension of the Munsell system of color that corresponds most closely to saturation, which is the degree of vividness of a hue.

Figure 1:
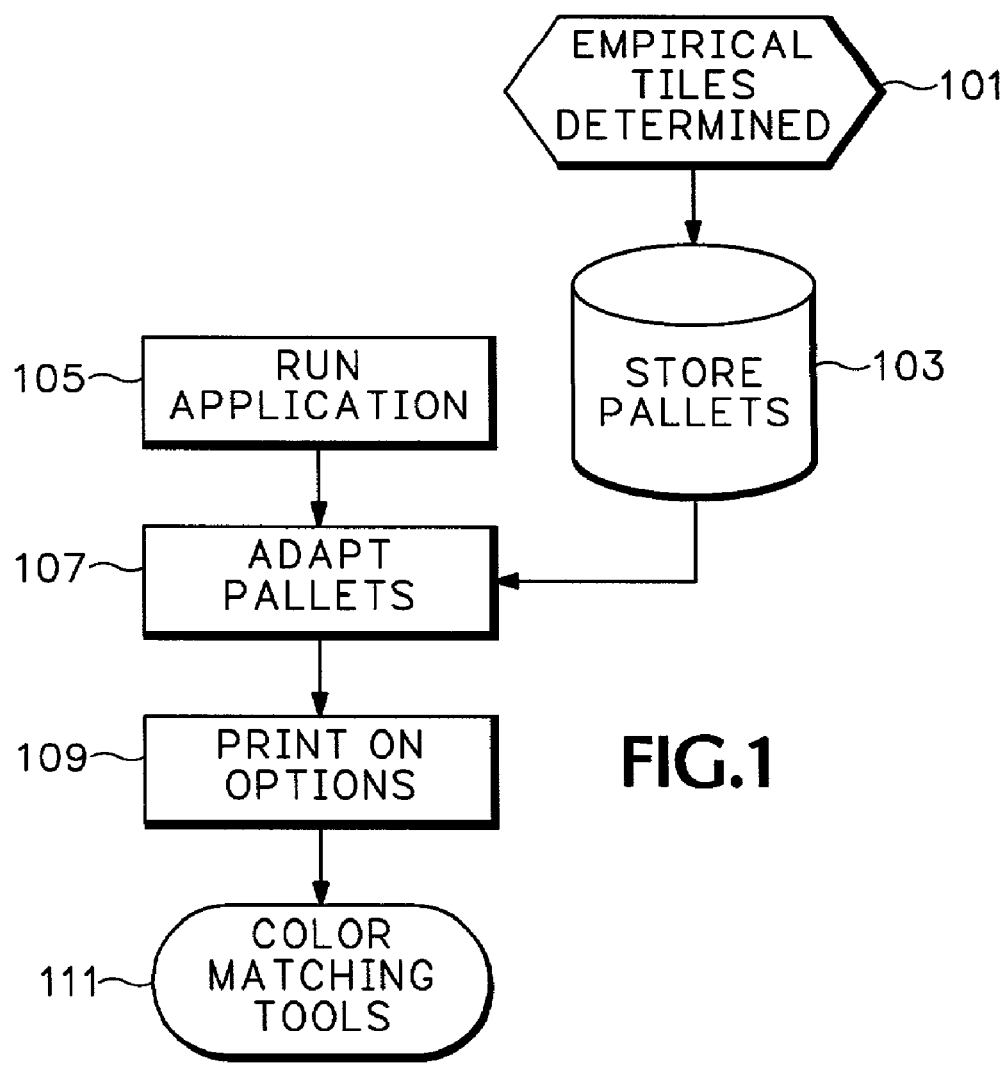
FIG. 1 is a flow chart illustrating the method of the present invention.
Figure 2:
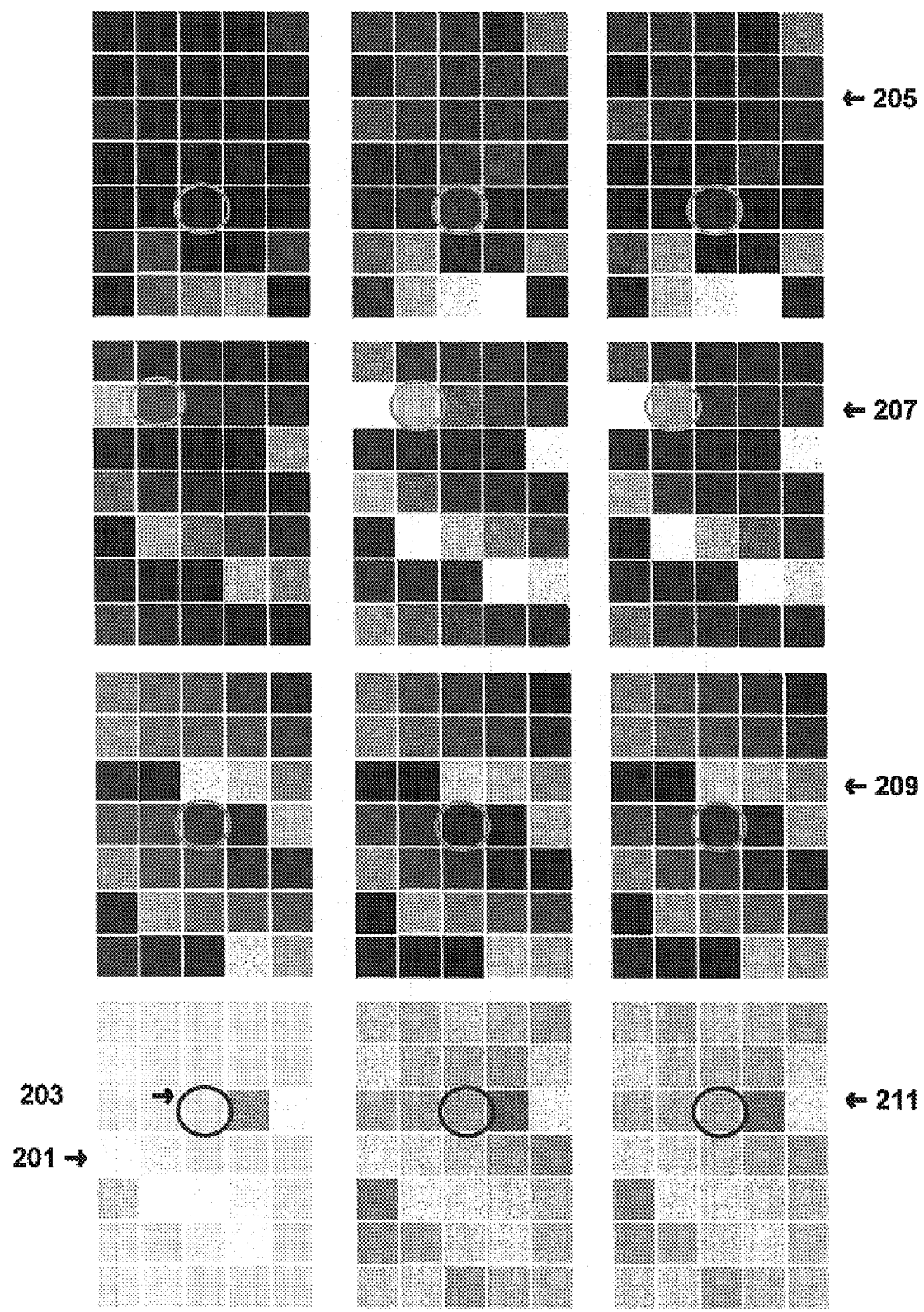
FIG. 2 is a color chart depicting exemplary color palettes in accordance with the present invention as shown in FIG. 1.

Turning now to both FIGS. 1 and 2, a set of color palettes are created 101, 102 wherein each individual hue palette has a range of chromas which visually can be described as a similar color. FIG. 2 is an example of the same color swatch tool printed on three different printers or 3 different sheets of paper (labeled by column as A, B and C). For example, palette 201 has thirty-five tiles, such as the exemplary circled tile 203, each tile of the set being visually perceived and describable as a shade of the color "yellow." Each such tile, and therefore each palette, is empirically determined 101 and stored 103 by providing a set of tristimulus space coordinates. From tile-to-tile, variations of the coordinates are entered to form each individual palette so that a range of yellow chromas are available. Going further, however, note that the same empirically created palette data printed on "printer or paper A" is perceptually different from the palette data printed on "printer or paper B" and from the palette data printed on "printer or paper C." Therefore, by printing the set of palettes—in the exemplary embodiment of FIG. 2, a set of blue 205, red 207, green 209, and yellow 211, individual palettes—on the current printer C or on current paper C, the end-user is provided with a representation of thirty-five chromas for each hue that is available for a current project. Similar tool sheets can be printed for each available printer or paper, e.g., A or B, or combination thereof. In other words, a color swatch tool is available to determine which shade, or more formally which color value, is most appropriate to use on a specific project to match existing printed colors or to provide competitive print quality examples between options, e.g., A, B or C.

Note that the palette designer may take the further step of predetermining sets of palettes for known printers or papers. For example, the designer can take a data set of variable yellow chromas using tristimulus space color coordinates and create a number of variations. The designer can then print the palette from the stored data on a variety of available print media using a particular printer (or a particular media on a variety of available color hard copy machines). Using known manner photometric, the designer can then read the printed palette tiles for each media and derive a new set of tristimulus space color coordinates for each chroma tile of each hue. These values can be stored, effectively pre-correlating for the end-user approximated results for each.

Note that the palettes can be stored on-board in memory of a controller card of a hard copy apparatus or can be in a software run on a host computer connected to a printer or set of printers.

In operation, assume the end-user is running a presentation software application 105. With prior systems, the end-user is forced to select a color from a "canned" set of values provided with the application software. For example, there may be three shades of yellow provided. The end-user must create the slide with all three, print all three on each available media with each available printer, then go back and keep the slide best suiting the user's preference. In accordance with the present invention, the stored palettes are adapted 107 to the application program by known manner software interface routines, such as providing the presentation software manufacturer with appropriate driver protocols. Next, the palette set is printed 109; for example, the end-user may be anticipating that an Hp™ Colorsmart™ glossy paper may be best suited to a particular presentation slide created with the presentation software, but is unsure about the available options of using a color laser HP LaserJet™ printer—printer A—or a color ink-jet HP DeskJet™ printer—printer B. The palette set can be printed on both as the color matching tool 111. The end-user determines that the desired yellow for the presentation is found in a certain tile 203. Thus, the proper selection would be printer A for the current job with the tristimulus color space coordinate value associated with tile 203. The appropriate data is then provided to the application software program.

It can now be recognized that the present invention provides the ability to print out a sheet or sheets of selected colors in different shades and values to use as a color selection tool when designing color documents. This information is useful in making an exact color match selection without using a hit-and-miss method, saving both time and wasted paper and colorant. The choice of media type or printer type to use in a current project to get the most pleasing visual presentation is facilitated.

Moreover, the tool provided in accordance with the present invention can be employed to compare colors with output from competitive printers or to match an existing printed piece or object.

In a preferred embodiment, the individual tiled palettes are scalable and separately printable such that the end-user can put all palettes on a single sheet or optionally have larger tiles by printing only, e.g., the blue palette 205 to fit on a single sheet.

Figure 3:
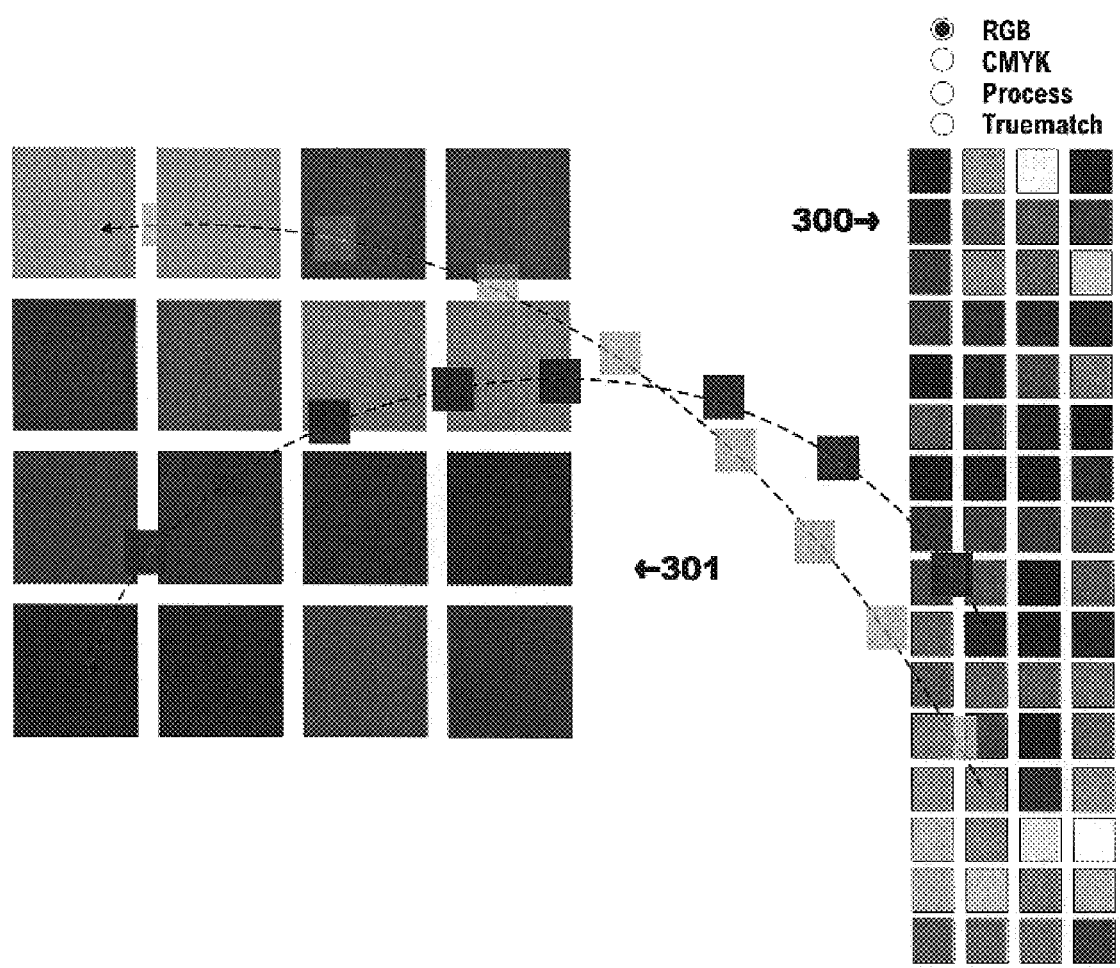
FIG. 3 is a color chart example of application of the color palettes as a color matching tool.

In an alternative embodiment, as represented by FIG. 3, the color palettes can be selectable as to a range of chromas for a current project. The stored data can then be arranged as a set of RGB, CMYK, Process™ (a four color process wherein CMY inks in varying combination create all other colors), Truematch™ (a hue-saturation-brightness organized color matching system for specifying process colors; based on the CMYK color model wherein extra colors do not add extra color separation), or the like, sets (represented by an RGB set 300) in the stored palettes data 105 (FIG. 1 only). If the end-user is using a printer having RGB toners, a known manner drag-and-drop selection of available chromas is made to create a custom palette 301 for printing on the several available printers or papers A, B, C (FIG. 2).

The foregoing description of the preferred embodiment of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . " and no process step herein is to be construed under those provisions unless the step or steps are expressly recited using the phrase "comprising the step(s) of . . . ."

What is claimed is:

1. A color matching tool device, comprising:
   a set of color palettes, each set encoded with data relating to a predetermined hard copy apparatus type; and
   each individual palette of the set having a subset of differing chroma value tiles for a predetermined hue, each tile forming the individual tiles of each said individual palette being predefined by tristimulus space color coordinates and wherein said set of color palettes is printable from a predetermined computer application program and each said tile is selectable from the program.

2. The device as set forth in claim 1 wherein each color palette includes tiles of only one hue and each individual palette of the set of color palettes is separately printable.

3. The device as set forth in claim 1 comprising:
   each individual palette of the set of color palettes is separately scalable.

4. A color matching tool device, comprising:
   a set of color palettes, each set of color palettes encoded with data relating to a predetermined print media type; and
   each individual palette of the set having a subset of differing chroma value tiles for a predetermined hue, each tile forming the individual tiles of each said individual palette being predefined by tristimulus space color coordinates and wherein said set of color palettes is printable from a predetermined computer application program and each said tile is selectable from the program.

5. A color matching tool device, comprising:
   a set of printable color palettes;
   each individual palette of the set having differing chroma value tiles for a single hue;
   each tile having predefined tristimulus space color coordinates; and
   each tile being associated with a specific type of printer.

6. The device as set forth in claim 5, wherein each tile is associated with a specific printer.

7. The device as set forth in claim 5, wherein each palette is associated with a specific type of printer and each tile is associated with a specific type of printer through the palette association.

8. A color matching tool device, comprising:
   a set of printable color palettes;
   each individual palette of the set having differing chroma value tiles for a predetermined hue;
   each tile having predefined tristimulus space color coordinates; and
   each tile being associated with a specific type of print media.

9. The device as set forth in claim 8, wherein each palette is associated with a specific type of print media and each tile is associated with a specific type of print media through the palette association.

10. A method comprising:
    printing a color palette having differing chroma value tiles for a single hue, each tile in the palette defined by tristimulus space color coordinates; and
    associating each tile with a specific type of printer.

11. The method of claim 10, wherein associating each tile with specific type of printer comprises associating each tile with a specific printer.

12. The method of claim 10, wherein associating each tile with specific type of printer comprises associating the palette with a specific type of printer.

13. A method comprising:
    printing a color palette having differing chroma value tiles for a single hue, each tile in the palette defined by tristimulus space color coordinates; and
    associating each tile with specific type of print media.

14. The method of claim 13, wherein associating each tile with a specific type of print media comprises associating the palette pallet with a specific type of print media.

* * * * *

UNITED STATES PATENT AND TRADEMARK OFFICE
CERTIFICATE OF CORRECTION

PATENT NO. : 7,092,121 B2 Page 1 of 1
APPLICATION NO. : 09/792259
DATED : August 15, 2006
INVENTOR(S) : Janie W. Budell It is certified that error appears in the above-identified patent and that said Letters Patent is hereby corrected as shown below:

On the Title page, in Item (57), under "Abstract", line 4, delete "pallets" and insert -- palettes --, therefor.

On Drawing sheet 1 of 3, in Fig. 1, in Box "103", line 2, delete "PALLETS" and insert -- PALETTES --, therefor.

On Drawing sheet 1 of 3, in Fig. 1, in Box "107", line 2, delete "PALLETS" and insert -- PALETTES --, therefor.

In column 6, line 52, in Claim 11, after "with" insert -- a --.

In column 6, line 55, in Claim 12, after "with" insert -- a --.

In column 6, line 62, in Claim 13, after "with" insert -- a --.

In column 6, line 65, in Claim 14, delete "pallet" before "with".

Signed and Sealed this

Twenty-fourth Day of March, 2009

JOHN DOLL
*Acting Director of the United States Patent and Trademark Office*